(12) United States Patent
Block et al.

(10) Patent No.: US 9,090,125 B2
(45) Date of Patent: Jul. 28, 2015

(54) MOUNTING PLATE AND CASTOR WITH A MOUNTING PLATE

(75) Inventors: Wolfgang Block, Wermelskirchen (DE); Karl-Heinz Plautz, Hagen (DE)

(73) Assignee: Tente GmbH & Co. KG, Wermelskirchen (DE)

( * ) Notice: Subject to any disclaimer, the term of this patent is extended or adjusted under 35 U.S.C. 154(b) by 0 days.

(21) Appl. No.: 14/129,123

(22) PCT Filed: Aug. 14, 2012

(86) PCT No.: PCT/EP2012/065888
§ 371 (c)(1),
(2), (4) Date: Feb. 19, 2014

(87) PCT Pub. No.: WO2013/026744
PCT Pub. Date: Feb. 28, 2013

(65) Prior Publication Data
US 2015/0033500 A1   Feb. 5, 2015

(30) Foreign Application Priority Data

Aug. 25, 2011   (DE) .......................... 10 2011 052 981

(51) Int. Cl.
*B60B 33/00*   (2006.01)
*B60B 33/02*   (2006.01)
(52) U.S. Cl.
CPC ......... *B60B 33/0005* (2013.01); *B60B 33/0018* (2013.01); *B60B 33/02* (2013.01);
(Continued)

(58) Field of Classification Search
USPC .................. 16/30, 32, 33, 42 R, 31 R, 29, 39;
248/188.8, 129, 346.11, 352;
280/79.11, 3, 47.34, 47.35, 32.6
See application file for complete search history.

(56) References Cited

U.S. PATENT DOCUMENTS 2,262,433 A * 11/1941 Uecker et al. ................. 16/35 R
5,579,871 A    12/1996 Emmrich et al.
(Continued)

FOREIGN PATENT DOCUMENTS

DE   21 36 353 A1   2/1973
DE   22 39 339 A1   3/1973
(Continued)

OTHER PUBLICATIONS

International Search Report of PCT/EP2012/065888, mailed Dec. 17, 2012.

*Primary Examiner* — Chuck Mah
(74) *Attorney, Agent, or Firm* — Collard & Roe, P.C.

(57) ABSTRACT

The invention relates to a mounting plate (4) which is placeable on a fork (3) or a rotary bearing of a caster (1) and which is connectable to the fork (3) or to a part of the rotary bearing (43), the invention also relating to a caster (1) comprising a fork (3) and/or a rotary bearing (43), and also a wheel (2), and a mounting plate (4) that is disposed at the upper side of the fork (4) and/or the rotary bearing (43), as well as a caster (1) comprising a wheel (2) and a fork (3), the fork (3) being rotatable relative to a locking part (33) about a vertical axis (A), and a first spring part (21) that is fixed to the fork being provided for interacting with the locking part (33) with regard to rotational locking. In order to provide a configuration of a mounting plate that is advantageous with regard to a lockable caster, and/or to provide an advantageous caster having a locking device and a mounting plate, and/or to provide an advantageous embodiment of a caster having a locking device, it is proposed that a transmission part (7) is provided on the underside on the mounting plate (4) and is connected thereto for locking the caster (1), the transmission part (7) to be acted on by a sliding part (8) that likewise is connected to the mounting plate (4).

15 Claims, 8 Drawing Sheets

(52) U.S. Cl.
CPC ............ *B60B 33/021* (2013.01); *B60B 33/025* (2013.01); *B60B 33/0039* (2013.01); *B60B 33/0049* (2013.01); *B60B 33/0068* (2013.01); *B60B 33/0081* (2013.01)

(56) References Cited

U.S. PATENT DOCUMENTS

| | | | |
|---|---|---|---|
| 6,219,881 B1 * | 4/2001 | Wen ............................... | 16/35 R |
| 6,854,567 B2 * | 2/2005 | Suzuki ........................... | 188/1.12 |
| 7,810,613 B2 * | 10/2010 | Lin ................................. | 188/1.12 |
| 7,987,553 B2 * | 8/2011 | Lin ................................. | 16/35 R |
| 8,671,519 B1 * | 3/2014 | Spraley et al. ................... | 16/30 |
| 2003/0094554 A1 * | 5/2003 | Bushey ........................... | 248/223.41 |
| 2004/0020008 A1 * | 2/2004 | Harris et al. ................... | 16/35 R |
| 2008/0229545 A1 * | 9/2008 | Duvert et al. ................... | 16/35 R |
| 2009/0276977 A1 * | 11/2009 | Liao ............................... | 16/35 R |
| 2010/0132157 A1 * | 6/2010 | Chiu ............................... | 16/30 |
| 2012/0005858 A1 * | 1/2012 | Lai ................................. | 16/45 |
| 2013/0187527 A1 * | 7/2013 | Graham et al. ................. | 312/401 |

FOREIGN PATENT DOCUMENTS

| | | |
|---|---|---|
| DE | 94 17 054 U1 | 2/1996 |
| DE | 19716550 A1 * | 10/1998 |
| DE | 102 59 448 A1 | 7/2004 |
| DE | 20 2006 014 765 U1 | 2/2008 |
| EP | 476237 A1 * | 3/1992 |
| EP | 1629999 A2 * | 3/2006 |
| JP | 09076704 A * | 3/1997 |
| WO | WO 2010010655 A1 * | 1/2010 |

\* cited by examiner

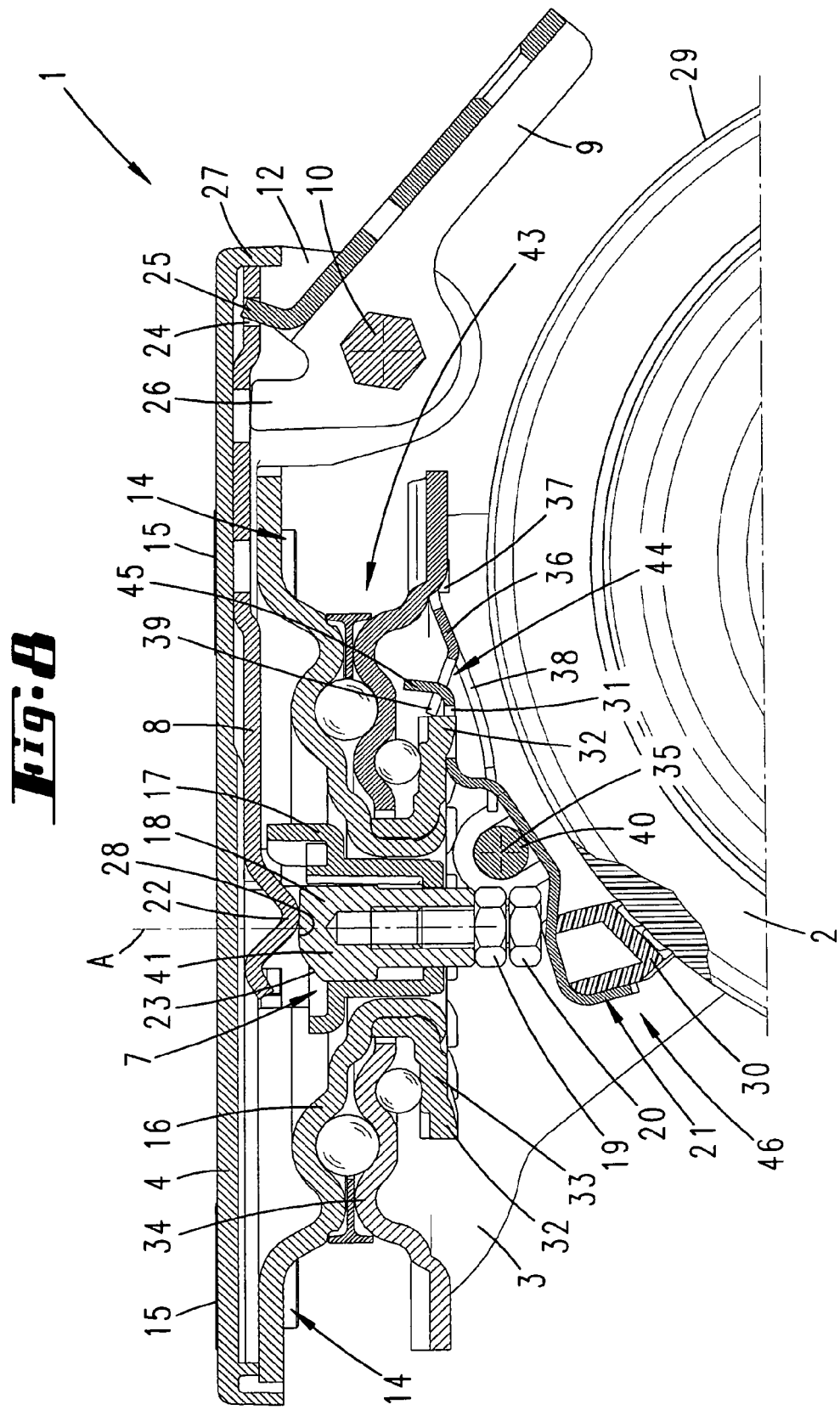

MOUNTING PLATE AND CASTOR WITH A MOUNTING PLATE

CROSS REFERENCE TO RELATED APPLICATIONS

This application is the National Stage of PCT/EP2012/065888 filed on Aug. 14, 2012 which claims priority under 35 U.S.C. §119 of German Application No. 10 2011 052 981.0 filed on Aug. 25, 2011, the disclosure of which is incorporated by reference. The international application under PCT article 21(2) was not published in English.

BACKGROUND OF THE INVENTION

1. Field of the Invention

The invention relates in first instance to a mounting plate which is placeable on a fork or a rotary bearing of a caster and which is connectable to the fork or a part of the rotary bearing.

The invention further relates to a caster comprising a fork and/or a rotary bearing, and also a wheel, and a mounting plate disposed at the upper side of the fork or the rotary bearing.

2. The Prior Art

Casters of the mentioned kind are already known in many respects. In first instance, reference is made to DE 20 2006 014 765 U1. The transmission part provided in this caster is held within the fork and on the rotary bearing, and is biased into the locking or blocking position by means of a (single) spring that is formed as a compression spring.

The known caster also has a mounting plate which, however, is formed as an integral part of the rotary bearing.

A caster is known from DE 22 39 339 A1, the transmission part of which is operated via a sliding part that is disposed above an upper end of the transmission part so as to be displaceable transversely with respect to the movement of the transmission part. The caster is formed in a conventional manner with a receiving journal in which the transmission part, which is secured to the caster, is accommodated. A comparable configuration of a caster is also disclosed in U.S. Pat. No. 5,579,871 A.

A caster is known from DE-A1-102 59 448 in which a flange housing is formed via a positive-locking connection with a part that is held on the rotary bearing by means of a press fit. The flange housing encloses a sliding part, below which a transmission part that engages over the rotary bearing is disposed. The transmission part is not connected to the flange housing. DE 94 17 054 discloses a caster in which a transmission part which passes through the rotary bearing acts via a rocker-like lever in a spacer frame. The transmission part is not connected to the spacer frame. DE-A1-21 36 353 likewise discloses a caster in which a transmission part is to be actuated by a sliding part that is disposed outside of the caster. During disassembly, the transmission part remains in the caster substructure.

SUMMARY OF THE INVENTION

Based on the mentioned prior art, it is an object of the invention to provide a configuration of a mounting plate that is advantageous with regard to a lockable caster, and/or to provide an advantageous caster having a locking device and a mounting plate.

According to a first inventive concept, said object is achieved with a mounting plate on the underside of which a transmission part is disposed and is held thereon for locking the caster, the transmission part to be acted on by a sliding part which likewise is held on the mounting plate, and furthermore, a holding part being provided which holds the transmission part and is likewise secured to the mounting plate and which guides the sliding part that is disposed between the mounting plate and the transmission part, the holding part furthermore having a dome-like shape, and the transmission part being formed as a tappet part with an upper enlargement via which it is held captive in the holding part, the holding part being narrowed at the lower side with respect to the receiving space, and the transmission part, starting from and held on the mounting plate, being able to engage in a passage opening at the fork or the rotary bearing.

The object is also achieved with a caster, for which it is specified that a transmission part, which is provided on the underside of the mounting plate and is held thereby, is provided for total locking and/or directional locking by acting on the wheel and/or the rotary bearing, the transmission part being acted on by a sliding part which likewise is held on the mounting plate, the mounting plate furthermore being formed with passage openings that are associated with corner regions of the substantially rectangular mounting plate, the passage openings being provided with a downwardly protruding tube portion, or with an overlapping flange at the upper side, or being provided with connecting parts which leave no passage opening.

The sliding part allows provision of the mounting plate without a part, thus formed, protruding beyond the upper mounting surface. The sliding part is preferably disposed so as to be movable parallel to a plane of the upper side of the mounting plate, more preferably on an underside of the mounting plate.

It is preferred that the transmission part is provided for acting on the caster with regard to a directional lock and/or total lock. The transmission part can act in this regard on one or more engagement parts, which preferably are fitted on the caster substructure.

The transmission part can be associated with a central opening of the rotary bearing or is associated with such an opening in the assembled state of the caster or, in this respect, with the integral embodiment of the caster. The rotary bearing, which customarily and preferably is formed from sheet metal parts which are shaped for accommodating balls for forming a ball bearing and of which an upper part also may be formed at the same time as a bearing plate which, more preferably, serves for connecting to the mounting plate, is preferably formed with an inner central opening in which the transmission part can engage or through which it can pass.

The sliding part, as viewed in the vertical direction, is preferably disposed between the mounting plate and the transmission plate. At the same time, the sliding part can thus be guided by a holding part which holds the transmission part and which is likewise secured to the mounting plate, or solely by the holding part.

An actuating lever can be provided for actuating the sliding part. The actuating lever can be acted on by a foot of a user. It is in particular preferred that the actuating lever is likewise mounted on the mounting plate. In this configuration, the mounting plate at the same time also comprises the functional part for actuating the transmission part.

Furthermore, it is preferred that with regard to the mentioned functional parts, which optionally are provided individually or in combination, the mounting plate is provided without springs. In first instance this results in a simple mounting possibility for the mounting plate itself. Moreover, the one or more spring parts, which more preferably are nevertheless provided, are formed in the caster substructure which is to be connected or is connected to the mounting plate, and, for example, can be replaced together with the caster substructure.

With regard to the two spring parts that are provided for interacting with the locking part, it is also preferred that these spring parts are secured to the caster, preferably directly on the fork, so that they are oriented in opposite directions relative to one another. The arrangement in an oppositely oriented manner, an at least partial overlap preferably also being provided, allows an advantageous extent of the respective spring parts. The overlapping or interlocking arrangement also allows an advantageous utilization of space.

It is also preferred that the second spring part has guide extensions between which an engagement portion of the first spring part extends. The engagement portion, which interacts with the locking part, which, for example, can be a metal part comprising a ring gear formation, can be deflected in the rotational direction when under significant (torsional) load and also in dependence on the free spring length of this first spring part. The guide extensions can, for example, provide advantageous stabilization in this respect. It is also preferred that a brake part for locking the wheel is formed at the end of the first spring part that is located opposite from the engagement portion. This brake part can be a conventional brake block. More preferably, this region of the first spring part is disposed in alignment with the central opening and/or the transmission part. Direct action can thus take place.

Furthermore, it is also preferred that the first spring part is formed as a spring lever, more preferably as a spring rocker, and is pivotably mounted on the fork. The first spring part is preferably pivotably mounted in a region located centrally with respect to the longitudinal extent of the first spring part. The brake part is then preferably disposed at one end of the spring lever, and the region interacting with the locking part is formed at the other end of the first spring part.

BRIEF DESCRIPTION OF THE DRAWINGS

The invention is explained in greater detail below with reference to the accompanying drawing, which, however, shows only one exemplary embodiment of the invention. In the drawings:

FIG. 8 shows an illustration of the caster in the region of the mounting plate, corresponding to FIG. 4, in the state of total locking.

DETAILED DESCRIPTION OF THE PREFERRED EMBODIMENTS

Figure 1:
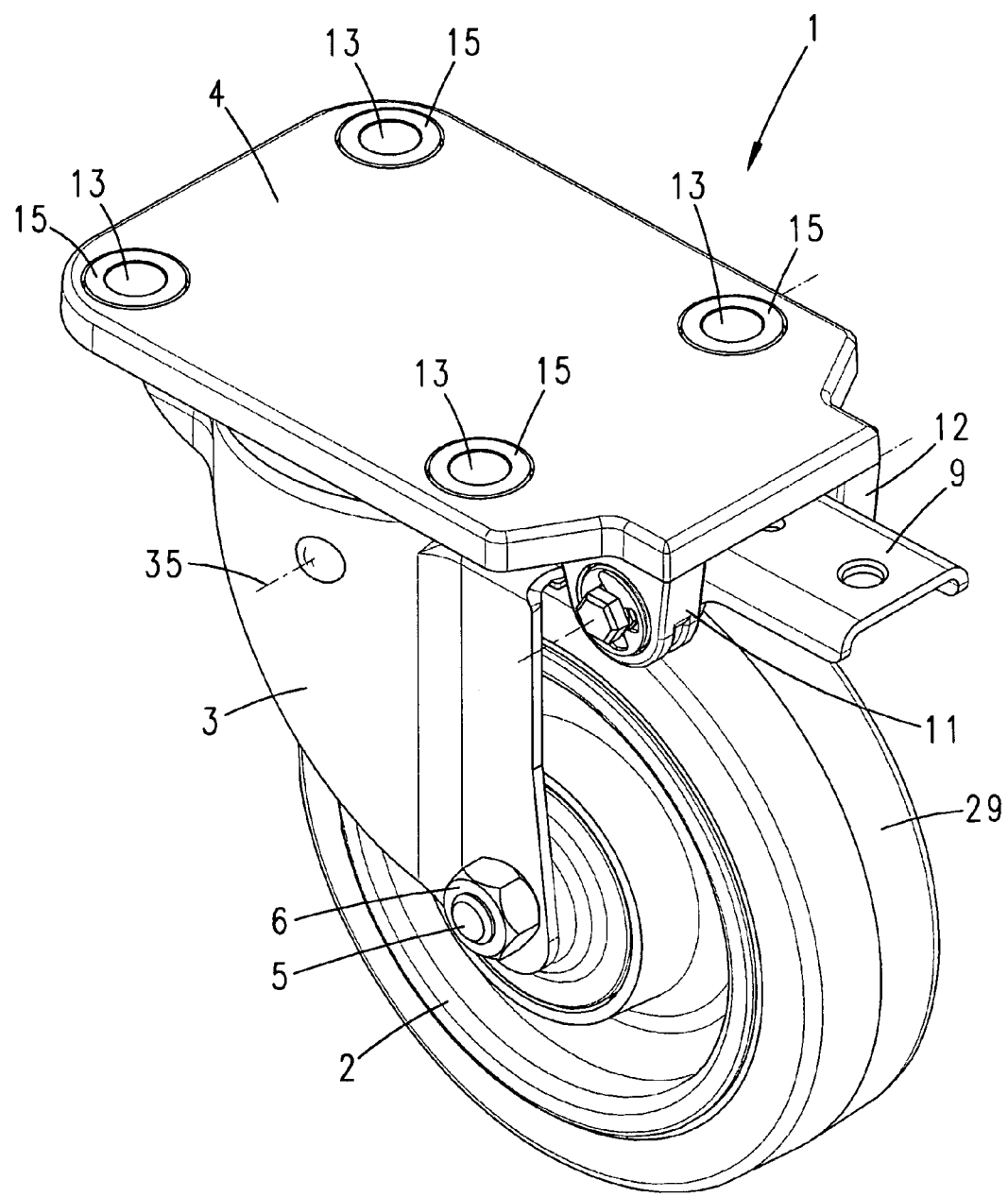
FIG. 1 shows a perspective view of a caster with a mounting plate fitted thereon.

Illustrated and described, in first instance with reference to FIG. 1, is a caster 1 comprising a wheel 2, a fork 3 and a mounting plate 4.

The wheel 2 is mounted in the fork 3 by means of an axle 5 (see FIG. 4, for instance), which at the outside of the fork 3, in the exemplary embodiment, is secured relative to the fork 3 by nuts 6 on the axle 5, which in this regard is provided with an external thread.

Figure 2:
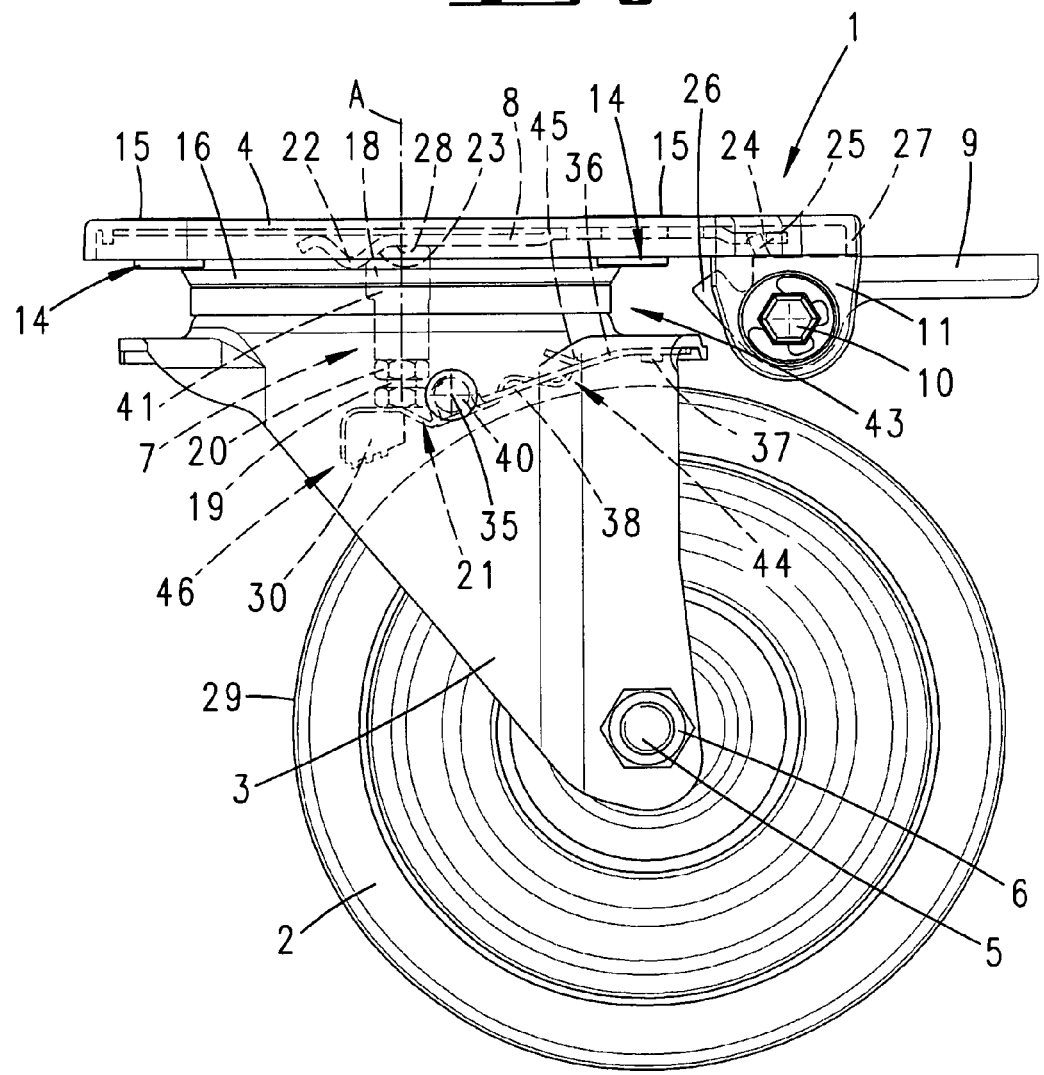
FIG. 2 shows a side view of the caster according to FIG. 1, with partially illustrated functional parts that are located inside the caster.

A transmission part 7, which can be acted on by a sliding part 8, is secured to the mounting plate 4 (see also FIG. 2). Furthermore, in the exemplary embodiment, the sliding part 8 can be moved by an actuating lever 9. The actuating lever 9 is likewise mounted on the mounting plate 4, in particular via an pin 10. In a further detail, the pin 10 for rotational locking via the actuating lever 9, which pin, as can be seen, is noncircular, namely, formed with a hexagonal cross-section in the exemplary embodiment, passes through two bearing receptacles 11, 12 that are formed at the underside of the mounting plate (also see FIG. 5).

Figure 5:
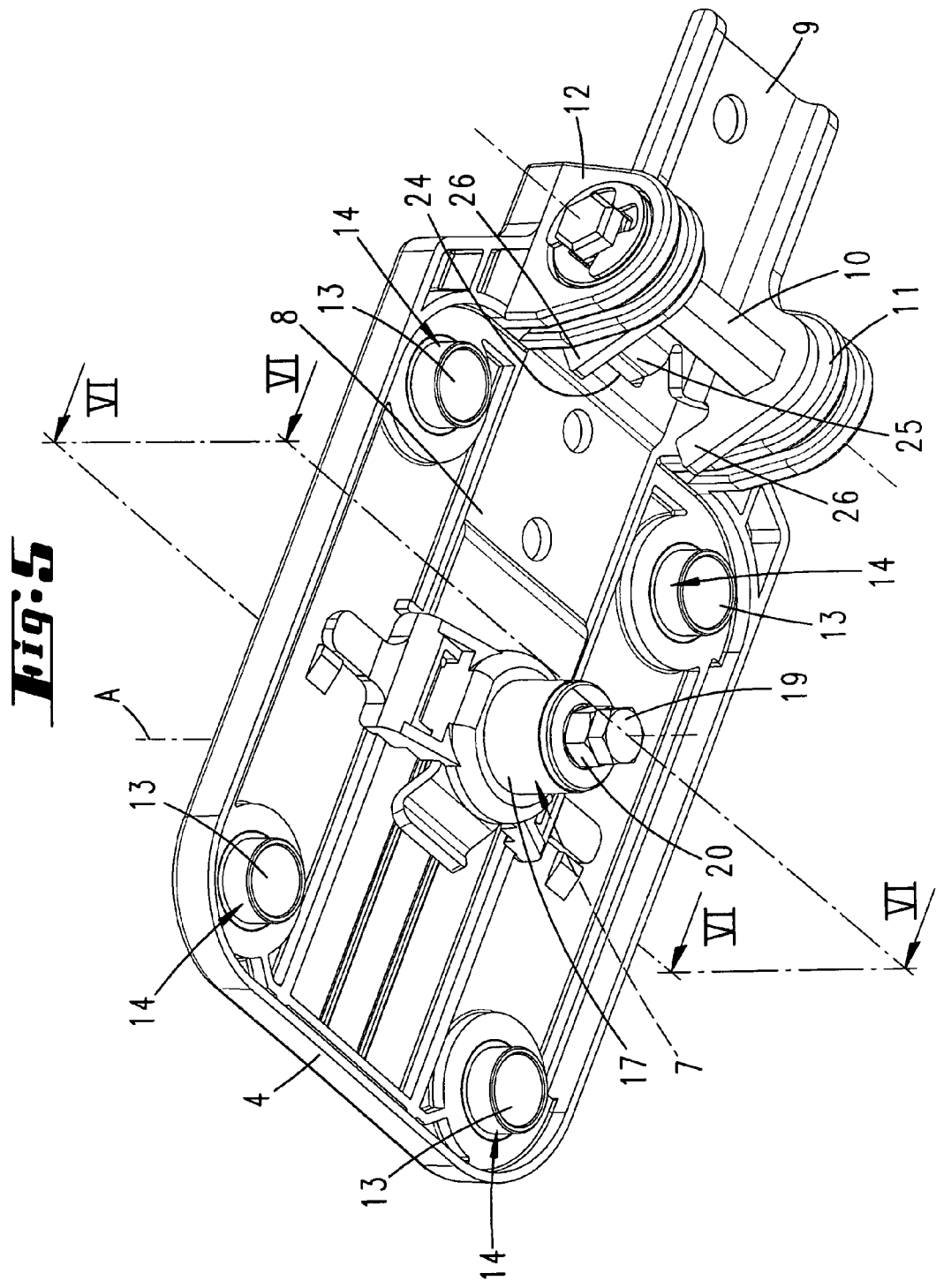
FIG. 5 shows a perspective bottom view of the mounting plate alone.
Figure 7:
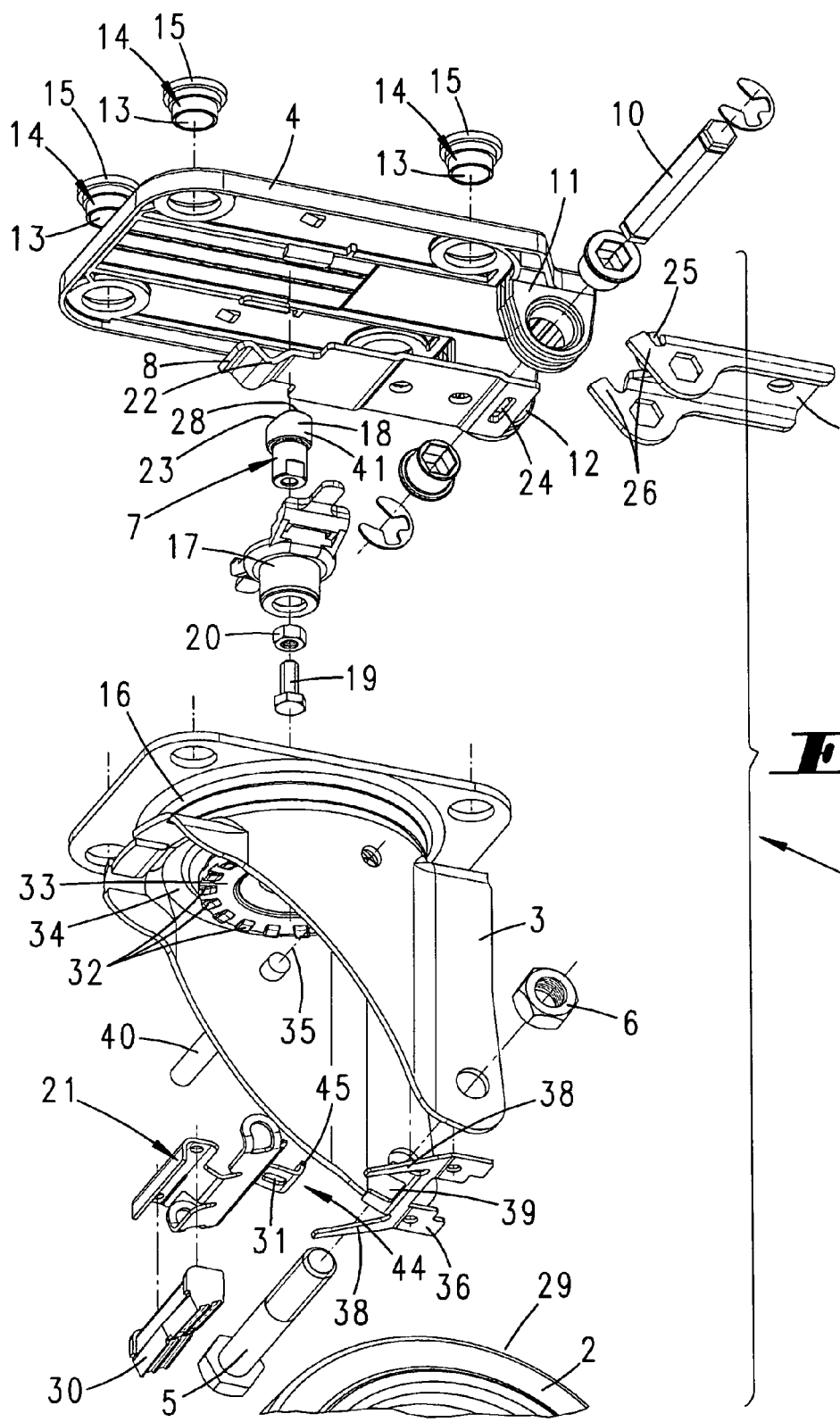
FIG. 7 shows an exploded view of the caster.

In a further detail, as is also apparent from FIG. 5, for instance, the mounting plate 4 is formed with passage openings 13 which are preferably associated with corner regions of the mounting plate 4, this plate, in the exemplary embodiment, being preferably substantially rectangular. In particular, these passage openings 13 are preferably provided, preferably in each case, with downwardly protruding tube segments 14, which, as can be seen from FIG. 7 for instance, are formed with an overlapping flange 15 at the upper end. The tube segments 14 can be inserted from above into the mounting plate, the overlapping flange 15 thereby engaging in a corresponding recess (see also FIG. 1, for example), so that at the same time a flat surface of the mounting plate 4 at the top is obtained. At the underside, the tube segments 14 in the mounted state may be used as a clamping connection with the caster substructure, for instance by means of a slight widening.

Instead of one, or a plurality, or all of the tube segments 14, connection parts can also be provided which have no passage opening and which thus contribute to a closed top surface of the mounting plate 4.

Figure 4:
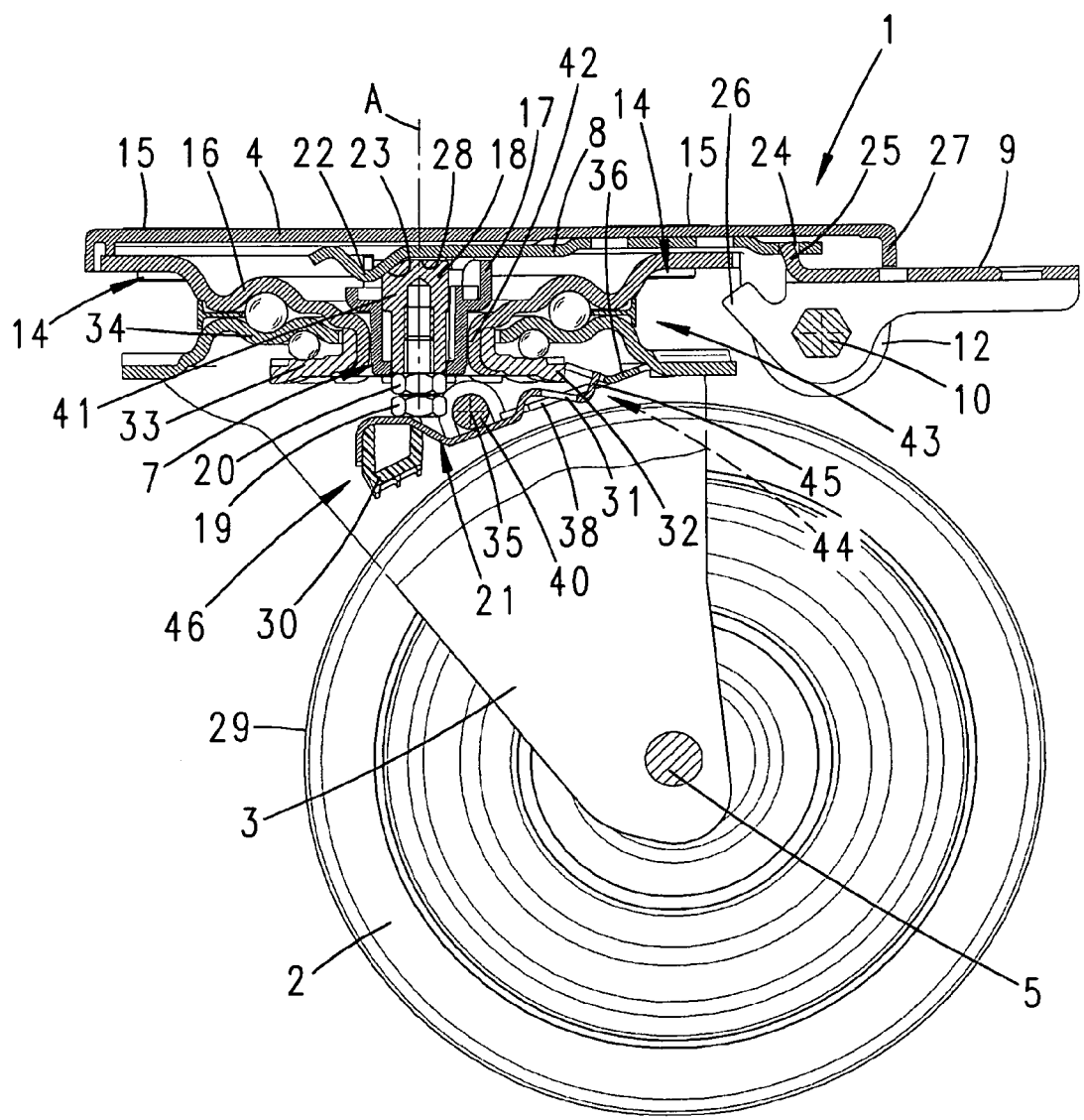
FIG. 4 shows a cross-section through the subject matter according to FIG. 1 and FIG. 3, partially sectioned in the plane IV-IV in FIG. 3, with the wheel in place.

As is apparent in further detail from FIG. 4, for instance, the mounting plate 4 in the exemplary embodiment is in particular connected to an upper bearing plate 16 of the rotary bearing of the illustrated caster. The bearing plate has openings corresponding to the tube segments 14, which segments pass through the openings and effect the clamping connection with the mounting plate due to the mentioned widening.

While the mounting plate 4 itself is formed, e.g., as a metal part, but preferably is formed as a plastics part, the tube segments or optionally another connection part is/are more preferably formed as metallic parts.

The transmission part 7 is accommodated in a holding part 17 that is secured to the underside of the mounting plate. As can be seen in the exemplary embodiment, the holding part preferably has a dome-like shape. The transmission part 7 as such consists of a tappet part 18 which is freely vertically displaceable, but preferably is limited by a stop, or in any case in a captive form, and which in the exemplary embodiment, in a further detail, accommodates a threaded bolt 19 at the underside which is secured by a nut 20 so as to achieve a counter effect here. The lower head of the threaded bolt is at the same time used for acting on the first spring part 21, which in the exemplary embodiment is provided for both brake locking and directional locking.

The transmission part 7, in the exemplary embodiment the tappet part 18, and preferably, as in the exemplary embodiment, the holding part 17, pass through a central opening 42 of the rotary bearing 43.

The tappet part 18 has an upper enlargement 41 via which it is held captive in the holding part 17, which is narrowed at the lower side with respect to the receiving space.

In a further detail, the sliding part 8, which is vertically situated on the underside of the mounting plate 4 between the mounting plate 4 and the tappet part 18, acts by means of a cam 22 on the end of the transmission part 7 on the mounting plate side, or, in the exemplary embodiment, specifically on the end of the tappet part 18. For this purpose, the tappet part 18 has an activating chamfer 23 on one side.

In the exemplary embodiment and preferably, the cam 22 is formed from the sliding part 8 itself, for example by deformation. The wall thickness of the sliding part 8 can be essentially unchanged, even in the region of the cam 22.

Furthermore, an engagement opening 24 is formed on the sliding part 8, preferably in the end region located opposite the cam 22, for the interaction between the actuating lever 9 and the sliding part 8. In the actuating position (see FIG. 8), a stop projection 26, which is provided on the actuating lever 9 at the cam side in relation to the hook portion 25 formed on the actuating lever 9 for interaction with the engagement opening 24, comes into contact with the mounting plate or, specifically in the exemplary embodiment, directly with the sliding part 8. Moreover, in this position, the sliding part 8 is preferably moved against a downwardly bent rim 27 of the mounting plate 8, as is also apparent from FIG. 8.

The mounting plate 4, as illustrated in detail also in FIG. 5, is preferably, and in the exemplary embodiment, formed without springs. For example, when not mounted on a caster substructure, the tappet part 18 can freely move vertically in the holding part 17. Also, in this state the sliding part 8 can be freely moved back and forth.

Figure 6:
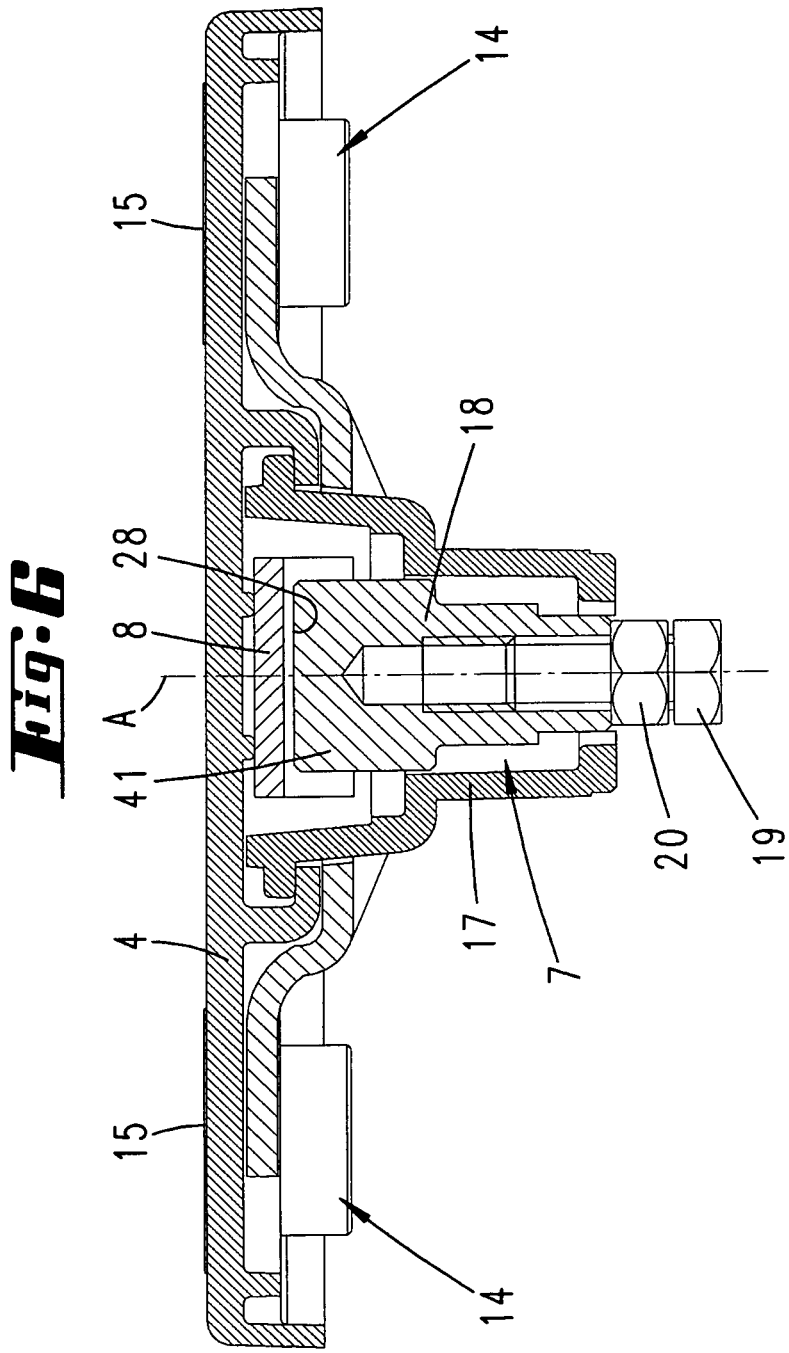
FIG. 6 shows a cross-section through the subject matter according to FIG. 5, sectioned in the plane VI-VI in FIG. 5.

All parts of the caster 1 according to FIG. 1 that are not illustrated in FIG. 5, or, respectively, the parts illustrated in the lower region of FIG. 6, starting with the bearing plate 16, as a whole are also referred to as a caster substructure.

In the engagement position according to FIG. 8, the cam 22 rests on an activating surface 28 of the tappet part 18, which is preferably planar and formed at least approximately parallel to an underside of the mounting plate 4 or in the direction of extent of the mounting plate 4. Due to the action on the sliding part 8 exerted in the direction toward the mounting plate 4, the action being associated with the movement of the sliding part into the engagement position according to FIG. 8 and being counteracted to a certain extent by the first spring part 21, a frictionally engaged mounting results in this position which cannot be discontinued without further actuation. Discontinuation of this position requires active actuation of the actuating lever 9 in the reset direction.

Figure 3:
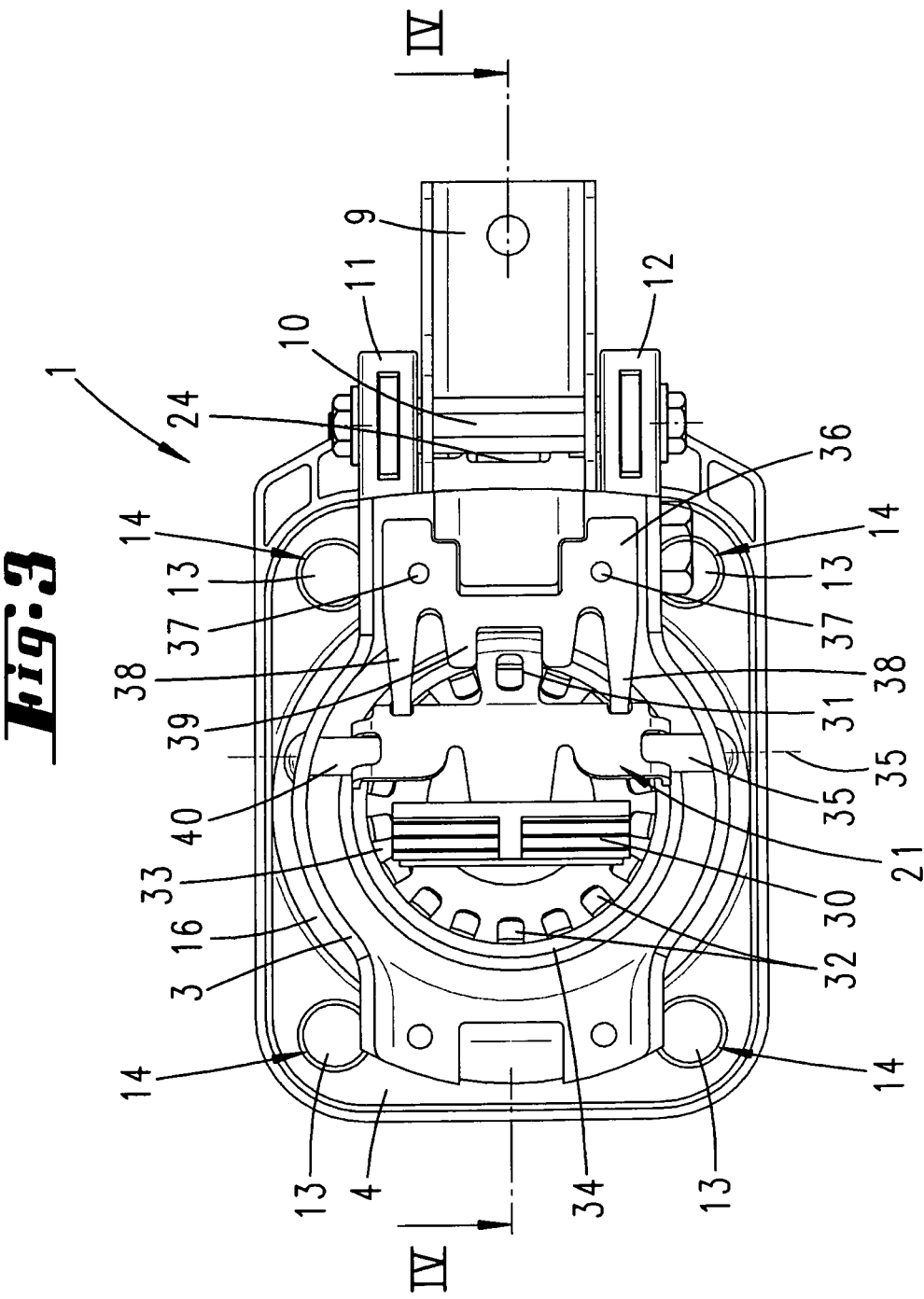
FIG. 3 shows a bottom view of the caster according to FIG. 1 and FIG. 2, with the wheel removed.

In particular, the caster 1 is formed with a directional lock and a total lock. For this purpose, an engagement part in the form of the first spring part 21 is provided. The first spring part 21, which is furthermore apparent and preferably formed in the exemplary embodiment as a lever part or rocker part, has at the one end a brake block, here in the form of a brake block 30 elongated in the direction of the axle 5, that is provided for acting on the wheel surface 29, and has a detent recess 31 at the other end. In the exemplary embodiment, the brake block 30 is accommodated in a portion of the first spring part 21 which is referred to as the brake part 46. By means of the detent recess 31, the first spring part 21 can interact with a tooth formation 32 on the locking part 33 (also see FIG. 3). The locking part 33 is at the same time a lower bearing plate of the rotary bearing, in which a central bearing plate 34 is also formed. In the exemplary embodiment, the bearing plate 34 transitions directly into the fork 3. The locking part 33 is fixedly connected to the upper bearing plate 16, and is therefore connected in a rotationally fixed manner to the mounting plate 4 to which, in turn, the upper bearing plate is fixedly connected. In contrast, the fork 3 with the central bearing plate 34 is rotatable relative to the locking part 33 about a vertical axis of rotation A.

In the exemplary embodiment, the first spring 21 is vertically pivotable in its end regions about the horizontal axle 35, but is connected in a rotationally fixed manner to the fork 3.

Thus, in the total locking position according to FIG. 8, the rotational locking of the fork 3 relative to the mounting plate 4 is also achieved.

A second spring part 36 is provided which is associated with the first spring part 21. The second spring part 36 is likewise fixedly mounted on the fork; in the exemplary embodiment, it is preferably mounted on the central bearing plate 34. The fastening location, preferably when fastening by means of pushfit rivets 37 (see FIG. 3, for instance), is situated at a distance from the end region of the first spring part 21, which end region faces the fastening location and forms the detent recess 31. Extending from here, the functional portions of the second spring part 36, the spring arms 38 and guide formations 39, are formed in such a way that they face the first spring part.

It is apparent that the engagement portion 44 of the first spring part 21, which engagement portion forms the detent recess 31, is disposed between the guide formations 39 in an overlapping manner with respect to a vertical projection. With regard to the vertical movement of the engagement portion 44 between the engagement position and the release position, the engagement portion has an upwardly bent hook portion 45 at its free end associated with the second spring part 36. Thus, regardless of the vertical movement, this end region of the first spring part 21 is in each case accommodated between the guide formations 39.

In contrast, the spring arms 38 are disposed in the transverse direction relative to the direction of extent of the first spring part 21 (the direction of extent being viewed in the direction linking the detent recess 31 to the brake part 30), and are disposed spaced apart from the latter. The spring arms 38 act on the first spring part near a mounting pin 40 for the first spring part 21. The first spring part 21, which in this respect is configured in a lever-like manner, is pivotable about this mounting pin 40. The spring arms 38 preferably act on the first spring part 21, as illustrated, at a distance of $1/10$ up to $1\times$ the diameter of the actual mounting pin 40 from a geometric pivot axis that passes through the mounting pin.

The mounting pin 40 is directly mounted in the legs of the fork 3.

LIST OF REFERENCE NUMERALS/CHARACTERS

1 Caster
2 Wheel
3 Fork
4 Mounting plate
5 Axle
6 Nut
7 Transmission part
8 Sliding part
9 Actuating lever
10 Pin
11 Bearing receptacle
12 Bearing receptacle
13 Passage opening
14 Tube segment
15 Overlap 16 Bearing plate
17 Holding part
18 Tappet part
19 Screw
20 Nut
21 First spring part
22 Cam
23 Activating chamfer
24 Engagement opening
25 Hook portion
26 Stop projection
27 Rim
28 Activating surface
29 Wheel surface
30 Brake block
31 Detent recess
32 Tooth formation
33 Locking part
34 Bearing plate, central
35 Axis
36 Second spring part
37 Pushfit rivets
38 Spring arm
39 Guide receptacle
40 Mounting pin
41 Enlargement
42 Opening
43 Rotary bearing
44 Engagement portion
45 Hook portion
46 Brake part
A Axis of rotation

The invention claimed is:

1. A mounting plate device comprising
a mounting plate,
a transmission part disposed on the underside on the mounting plate and held thereon and comprising a tappet part having an upper enlargement,
a sliding part held on the mounting plate, configured to act on the transmission part, being disposed between the mounting plate and the transmission part, and having a cam, and
a holding part holding the transmission part, being secured to the mounting plate, guiding the sliding part, and having a cup shape with a receiving space,
wherein the transmission part is held captive in the holding part via the upper enlargement,
wherein the holding part has a lower side and the receiving space is narrowed at the lower side, and
wherein an axial sliding of the sliding part pushes the cam against the transmission part so that the transmission part is pushed through the holding part.

2. The mounting plate device according to claim 1, wherein the mounting plate together with the transmission part and the sliding part are a prefabricated structural unit.

3. The mounting plate device according to claim 1, further comprising an actuating lever connected to the sliding part and configured to actuate the sliding part.

4. The mounting plate device according to claim 3, wherein the actuating lever is mounted on the mounting plate.

5. The mounting plate device according to claim 1, wherein the mounting plate is formed without springs.

6. A caster comprising
a fork,
a rotary bearing,
a wheel,
a mounting plate disposed at an upper side of the rotary bearing and having connecting parts,
a transmission part on an underside of the mounting plate and held thereby and comprising a tappet part having an upper enlargement, and
a sliding part held on the mounting plate and having a cam,
wherein an axial sliding of the sliding part pushes the cam against the transmission part so that the transmission part is pushed downwards.

7. The caster according to claim 6, wherein the sliding part is disposed between the mounting plate and the transmission part.

8. The caster according to claim 6, wherein the rotary bearing has an upper bearing plate, and
wherein the mounting plate is disposed on an upper side of the upper bearing plate and is securable to the upper bearing plate.

9. The caster according to claim 8, wherein the rotary bearing has a central opening, and
wherein the transmission part protrudes through the central opening of the rotary bearing.

10. The caster according to claim 6, further comprising a first spring part connected to the fork and configured to bias the transmission part in a first direction,
wherein the transmission part moves in a second direction opposite to the first direction as the transmission part is pushed downwards via the cam.

11. The caster according to claim 10, further comprising a brake block accommodated in the first spring part,
wherein when the transmission part is pushed downwards via the cam, the transmission part acts on the first spring part to pivot the first spring part downwards and to cause the brake block to contact a wheel surface of the wheel to brake the wheel.

12. The caster according to claim 10, wherein the rotary bearing comprises a lower bearing plate comprising at least one tooth formation,
wherein the rotary bearing further comprises an upper bearing plate,
wherein the mounting plate is disposed on an upper side of the upper bearing plate and is fixedly connected to the upper bearing plate,
wherein the lower bearing plate is fixedly connected to the upper bearing plate,
wherein the first spring part comprises a detent recess, and
wherein when the transmission part is pushed downwards via the cam, the transmission part acts on the first spring part and causes the first spring part to pivot so that the detent recess interacts with the at least one tooth formation.

13. The caster according to claim 6, wherein the mounting plate is substantially rectangular, has corner regions, and has passage openings disposed, respectively, in the corner regions,
wherein the connection parts are disposed in the corner regions, respectively,
wherein the connection parts each comprise a downwardly protruding tube segment, and
wherein the downwardly protruding tube segments pass through the passage openings, respectively.

14. The caster according to claim 13, wherein the downwardly protruding tube segments each have an upper side and an overlapping flange at the upper side.

15. The caster according to claim 6, wherein the connecting parts leave no passage opening.

* * * * *